United States Patent [19]

Brown et al.

[11] Patent Number: 4,714,235
[45] Date of Patent: Dec. 22, 1987

[54] CONSTANT DISPLACEMENT DUAL POSITION CAM STOP ASSEMBLY

[75] Inventors: Cal R. Brown, Euclid; Michael T. Gallagher, Mayfield Hts.; Peter C. Williams, Cleveland Heights, all of Ohio

[73] Assignee: Whitey Co., Highland Hts., Ohio

[21] Appl. No.: 873,005

[22] Filed: Jun. 16, 1986

[51] Int. Cl.⁴ ............................................. F16K 51/00
[52] U.S. Cl. ..................................... 251/288; 251/252; 74/526; 74/568 R
[58] Field of Search ............... 251/288, 285, 286, 252, 251/284; 74/526, 568 R

[56] References Cited

U.S. PATENT DOCUMENTS

| | | | |
|---|---|---|---|
| 11,431 | 7/1894 | Glauber et al. | 251/288 |
| 576,130 | 2/1897 | Keyes | 251/286 |
| 691,502 | 1/1902 | Sturges | 251/285 |
| 2,766,772 | 10/1956 | Welty et al. | 251/284 |
| 2,900,995 | 4/1959 | Dickerson et al. | 251/288 |
| 3,056,577 | 10/1962 | Kulisek | 251/315 |
| 3,090,595 | 5/1963 | Blyth | 251/284 |
| 3,460,800 | 8/1969 | Mikuls | 251/288 |
| 3,477,693 | 11/1969 | Bezanis | 251/285 |
| 3,552,434 | 1/1971 | Haenky | 251/285 |
| 3,813,080 | 5/1974 | Rogers | 251/285 |
| 3,896,681 | 7/1975 | Boyle | 74/526 |
| 3,970,285 | 7/1976 | Lonn | 251/288 |
| 4,444,072 | 4/1984 | Grimes et al. | 74/526 |

FOREIGN PATENT DOCUMENTS 459314 of 1913 France .
1078890 of 1953 France .
42506 2/1926 Norway .

Primary Examiner—A. Michael Chambers
Attorney, Agent, or Firm—Fay, Sharpe, Beall, Fagan, Minnich & McKee

[57] ABSTRACT

A dual position handle and cam stop assembly is provided which is adapted for limiting rotational movement of an associated valve sealing element such as a ball for a ball valve. However, the assembly is applicable to other types of valves such as butterfly and plug valves. The assembly comprises a cam disc and a valve handle having associated first and second handle stop and direction indicators. The indicators are disposed relative to the cam disc for engagement against the disc at first and second handle stop limit locations, respectively. The locations are selectively positionable by rotation of the cam disc while maintaining a constant relative angular spacing for limiting the rotational movement of the valve handle to the constant relative angular spacing. The cam disc has a cardioid-like contour about its peripheral wall for a constant angular displacement of the stop limit locations per a unit degree of cam rotation. The handle stop and direction indicators preferably comprise a symmetrical flat-faced cam follower.

8 Claims, 4 Drawing Figures

CONSTANT DISPLACEMENT DUAL POSITION CAM STOP ASSEMBLY

BACKGROUND OF THE INVENTION

This invention relates to the valve art, and, more particularly, to butterfly, ball and plug valves.

The invention is particularly applicable to a new and improved stop cam arrangement for limiting handle rotation to a pre-selected angular degree and for selective adjustment of stop limit locations to position a valve sealing member at optimum efficiency open and closed positions. However, it will become readily apparent to those skilled in the art that the invention is capable of broader applications and could be adapted for use in other types and styles of cam stop arrangements.

Ball valve constructions in commercial use typically employ many different types of stop arrangements useful for ball, butterfly or plug-type valves. Standard butterfly and ball valves usually require a ninety degree movement to take the valve element between a full open and a full closed position. Since an operator typically has no way of knowing the orientation of a valve element mounted in a valve body, handle stop and direction indicators located on the valve allow an operator to generally determine the valve element orientation and to thereby open or close the valve to a full open or full flow position, a fully closed position, or an intermediate limited flow position.

The various forms and types of stop cam arrangements which have heretofore been employed in the valve industry have met with varying degrees of success in that some of the devices have suffered from limited practical value.

Typically, a stop cam arrangement will comprise a flange or extending element depending from the valve handle and disposed for engagement with a portion of the valve body or a protrusion thereon. Although such prior known arrangements have been successful in limiting handle rotation to a particular degree, they have all suffered from one substantial problem. Often, tolerance stacking during the manufacturing process results in the valve element being slightly out of line or cocked with the valve inlet and outlet ports. Such a misalignment has caused less than optimum flow through the valve when open, due to the obstruction of a cocked valve element, and may even cause valve leaking when a stop position is so misaligned as to fail to orient the valve element in a sealing position. Consequently, it is desirable and, often times necessary, to adjust the handle limit stops to achieve the desired and optimum valve element alignments at the open and closed positions.

Although adjustable stop cam arrangements are known for adjusting the limits of movement of a valve sealing member, such adjustable stop elements have comprised clamped or threaded members which are necessarily independently adjustable to define the stop points. Such independent adjustment of stop limits too often allows a variance in the range of movement in the valve element and in the position of the stops for a valve handle. In other words, since one end of the valve movement is always adjustable by one element and the other end of the valve movement is adjustable by another element, there can be no corresponding adjustment of the opposite end of valve path movement upon adjustment of a first end. Such non-corresponding adjustment has resulted in problems and difficulty in setting the handle stop limits and in complicating the manufacturing process.

More specifically, although alignment of a valve element such as ball member having a fluid flow opening may be easily visibly detectible in the fully open position, the fully closed position may not be so easily determined. Accordingly, some conjecture is involved in setting an independently setable closed stop limit after having first independently set an open stop limit.

It has, therefore, been desired to develop a constant displacement dual position cam stop assembly for a valve which could be employed to selectively set the valve element stop limits to align the valve element in an optimum full flow open position and correspondingly a fully closed position. Preferably, such a design would eliminate the problems of non-alignment caused by tolerance stacking during manufacture of the valve.

The present invention contemplates a new and improved dual position cam stop assembly which overcomes all of the above referred to problems and others to provide a new and improved cam stop arrangement which facilitates increased manufacturing efficiency in construction and setting of valve element stop limits, is simple in design, economical to manufacture and readily adaptable to a plurality of type of valves having a variety of dimensional characteristics.

BRIEF SUMMARY OF THE INVENTION

Generally, the present invention contemplates a new and improved stop cam arrangement particularly useful on butterfly, ball and plug valves. The invention provides a single rotary stop element which allows both the open and closed positions of the valve to be simultaneously adjusted while maintaining a precise relative angular spacing between the open and closed position limits. The stop element is a symmetric spiral-like cam configured such that a given unit of rotation of the cam provides for constant angular displacement of the cam follower. In other words, a certain unit degree rotation of the cam shifts the locations of the stop limits a constant corresponding unit degree. This allows precise prediction of adjustment of one stop limit location by a corresponding adjustment of the other. In addition, the cam stop surfaces are contoured such that the open and closed positions are always located a constant relative angular spacing apart.

More specifically, the subject invention comprises a dual position handle and cam stop assembly adapted for limiting rotational movement of an associated valve sealing element. The assembly comprises a cam disc and a valve handle having first and second handle stop and direction indicators. The indicators are disposed relative to the cam disc for operative association with the disc at first and second handle stop locations, respectively, for rotation representative of valve element rotation. The locations are selectively positionable by rotation of the cam disc about a cam disc peripheral wall and have a constant relative angular spacing for limiting rotational movement of the valve handle to the constant relative angular spacing after cam rotation. The cam disc has a cardioid-like contour at the peripheral wall for a constant rate of angular displacement of the stop limit locations per a unit of cam rotation.

In accordance with another aspect of the present invention, the first and second handle stop and direction indicators comprise a symmetrical flat-faced cam follower.

In accordance with a more limited aspect of the present invention, the peripheral wall of the cam disc is configured for a constant degree of shift of the stop surface locations for each degree of rotation of the cam disc.

The principal object of the invention is the provision of an adjustable cam stop arrangement to simultaneously adjust the handle stop limits of a valve to achieve desired valve element alignment for optimum efficiency open and closed positions.

It is another object of the present invention to provide a cam stop assembly which allows corresponding angular adjustment of a first stop limit by adjustment of another stop limit.

Still another object of the present invention is the provision of a cam stop arrangement which maintains a constant relative angular displacement between the stop limits during adjustable rotation of the cam.

Still other objects and advantages of the invention will become apparent to those skilled in the art upon a reading and understanding of the following specification.

BRIEF DESCRIPTION OF THE DRAWINGS

The invention may take physical form in certain parts and arrangements of parts, a preferred embodiment of which will be described in detail in this specification and illustrated in the accompanying drawings which form a part hereof and wherein.

DETAILED DESCRIPTION OF THE PREFERRED EMBODIMENT

Figure 1:
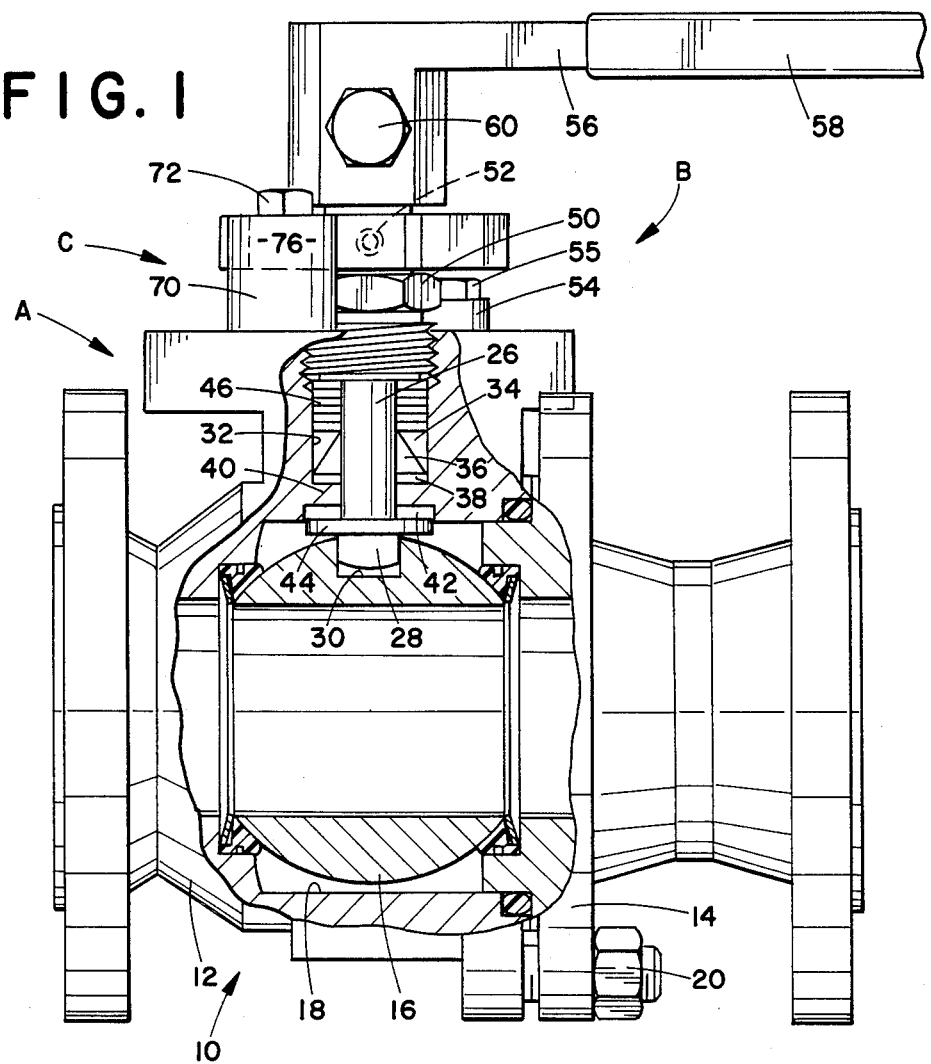
FIG. 1 is an elevational view, partially in cross-section, of an end-loaded ball valve which incorporates the preferred embodiment of the invention.

Referring now to the drawings wherein the showings are for purposes of illustrating the preferred embodiment of the invention only and not for purposes of limiting same, the FIGURES show a valve A including a handle B in association with a cam stop assembly C. More particularly, and with reference to FIG. 1, ball valve A includes a body or housing generally designated 10 having a main or central body section 12 and an end fitting 14. It can be seen by one skilled in the art that valve A is an end-loaded valve and that the valve element or sealing means comprises a ball 16 received in central body section 12 by assembly through central body passageway 18. The ball 16 is then sealed in the central body section 12 by fastening of the end fitting 14 to the central body section with the fasteners 20.

It will be appreciated that a showing of the subject invention in association with a ball valve is purely for purposes of illustration and that the subject handle stop arrangement could be used on a variety of valve types including butterfly, ball and plug valves, or any type of valve which generally requires a limited rotational movement to take the valve element between a full open and full closed position. Consequently, the details of the valve illustrated in the FIGURES may be modified as desired and/or necessary to accommodate the different types and styles of valve constructions.

The handle B is operatively associated with the ball 16 through a stem member 26 having a lower end 28 configured as shown for sliding receipt in a slot or groove 30 included in the upper end of the ball 16. This arrangement allows the ball to be rotated between valve open and closed positions while at the same time permitting the ball to have some freedom of movement for shifting axially in the valve body passageway 18 when the valve is in a closed position and fluid pressure is acting on the ball, in a manner well known in the valve art.

Stem member 26 extends outwardly through an opening 32 in central body section 12. Suitable packing rings 34, 36, and 38 are positioned in the opening 32 and sealingly engage the opening and stem member 26. As shown, lower packing ring 38 rests upon an inwardly extending flange 40 formed within opening 32. A split thrust washer 42 is positioned below flange 40 and clamped thereto by an outwardly extending shoulder or flange 44 formed at the base of the stem member 26. The stem is held in position by a number of reversely positioned spring washers 46 and a packing gland 50 threadedly received in the central body section 12. The gland 50 is adjusted to apply suitable pressure to the washers 46 and packing rings 34, 36, 38 to assure a fluid-tight seal about the stem 26. The gland 50 is held in its adjusted position by a lock plate 54 having a portion configured to positively engage and hold the hexagonal upper end of the gland 50. The plate 54 is adjustably secured to the body by a stud 53 which extends upwardly from body 12 through an arcuate opening 57 in plate 54. A jam nut 55 clamps the plate 54 to the body 12.

Although it is possible to actuate the valve stem 26 by many different types of actuators, including both manual or automatic, a manually operable handle B is shown. The illustrated handle B comprises a rigid handle portion 56 with a clamped tongue and groove attachment to the stem. A socket (not shown) provided in the top of the handle can be slipped over the stem 26 to operate the valve in applications where a handle is not normally attached. A resilient handle sleeve 58 received on handle portion 56 is for operator convenience and comfort in gripping the handle B. A handle bolt 60 releasably secured the handle to the stem 26.

Associated with the handle, and accordingly the stem 26, is a stop member and flow direction indicator 62 independently mounted to the stem 26 with a set screw 52 to show direction of flow even when the handle B is removed.

Figure 4:
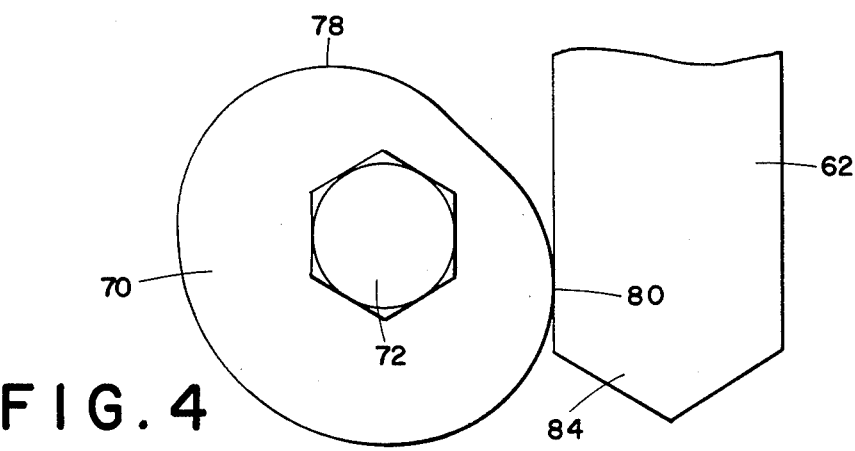
Figure 2:
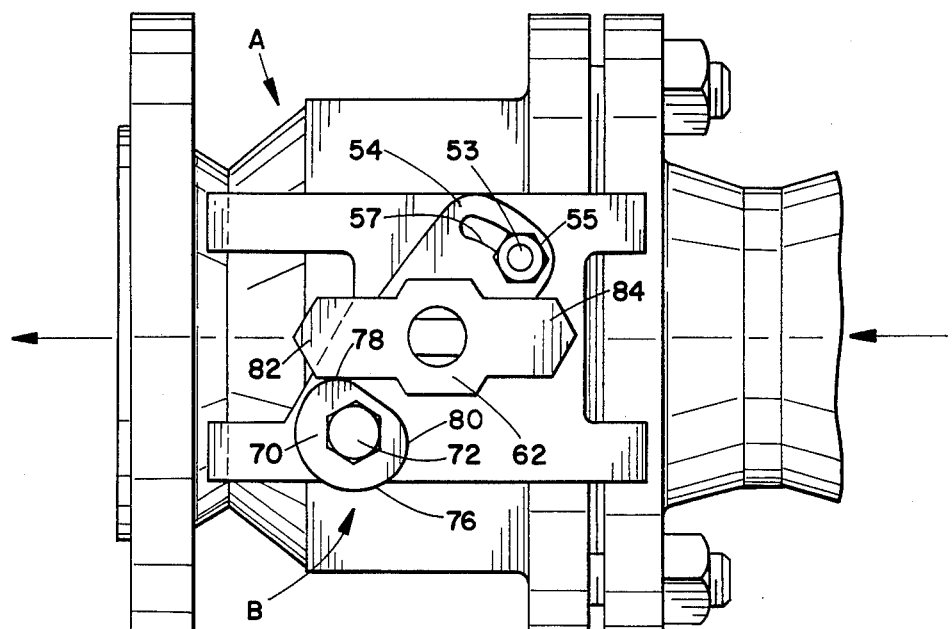
FIG. 2 is a plan view of the valve of FIG. 1 particularly illustrating the cam stop arrangement in which the valve element is aligned to a valve open position and with the handle deleted for ease of illustration.
Figure 3:
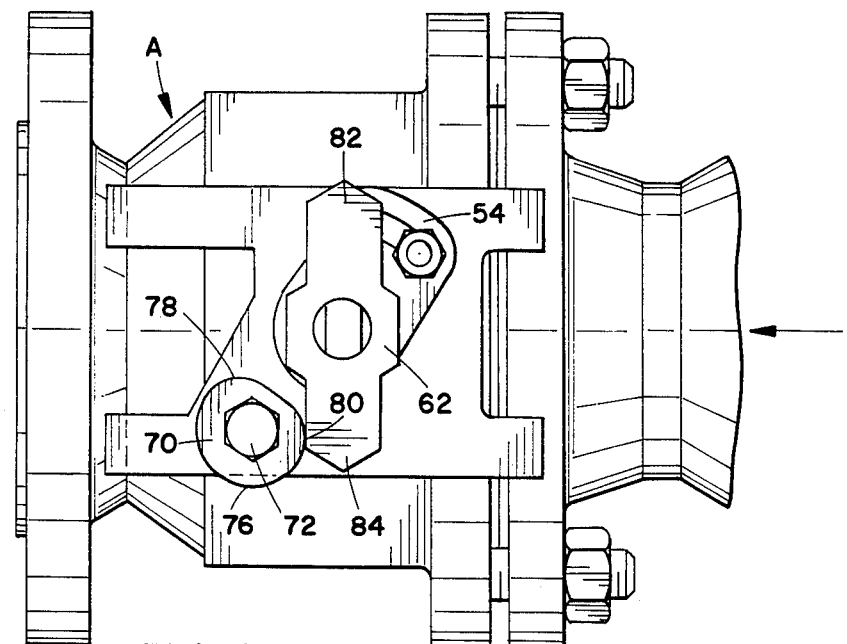
FIG. 3 is a plan view in which the valve element has been rotated generally ninety degrees to a fully closed position with the handle deleted for ease of illustration; and, FIG. 4 is a plan view of a cam disc and a stop member formed in accordance with the present invention showing generally the operative dimensional relationships.

With particular reference to FIGS. 2, 3 and 4, the handle stop member and direction indicator 62 preferably comprises a rigid, symmetrical flat-faced cam follower, having arrow-shaped end portions for visual indication of fluid flow and ball alignment. When the indicator 62 is aligned in the direction of the valve flow passageway, then the valve is opened as generally indicated in FIG. 1. When the indicator 62 is aligned in a direction perpendicular to the valve fluid flow passageway, then the ball 16 should be oriented to close and seal the passageway.

A cam stop or disc 70 is fastened to the central body section of the valve with a cam stop bolt 72. The cam disc is associated with the handle stop member 62 to provide a dual position handle and cam stop assembly adapted for limiting rotational movement of the valve sealing element.

The cam disc 70 is adjustably fastened to the valve A to allow for cam disc rotation and selective positioning relative to the stop member 62 and accordingly the stem member 26 and ball 16. Selective positioning of the cam disc is desired to define selective handle stop limits comprising a handle open limit and a handle closed limit. It is a feature of the invention that the cam stop is configured with a symmetrical spiral-like peripheral contour to maintain a constant preselected angular spacing between the open and closed limits at any ultimately selected stop limit position whereby placing the handle at the preselected handle stop limit positions orients the valve sealing element at an optimum efficiency open and closed positions, and further provides for a constant rate of angular displacement of the stop limit locations per a unit of cam rotation.

More specifically, the peripheral wall contour of the cam disc 70 has a cardioid-like configuration and includes a peripheral wall 76 having first and second cam surface locations 78, 80 defining the handle open and closed stop limits, respectively. The cam surface locations 78, 80 are disposed to maintain the relative angular spacing between the stop limits during the adjustable positioning of the cam disc 70.

After adjustments, the cam stop may be subsequently welded to the body 12.

The stop member 62 comprises a flat-faced follower including first and second radially extending handle stop and direction indicators 82, 84 which are disposed relative to the cam disc 70 for engagement against the disc 70 at the first and second handle stop limit locations 78, 80, respectively. The locations 78, 80 are selectively positionable about the cam disc peripheral wall 76 by rotation of the disc. The locations have a constant relative angular spacing for limiting the rotational movement of the valve handle and valve stem to the constant preselected relative angular spacing during the cam rotation. Typically, the relative angular spacing will comprise ninety degrees but it is within the scope of the invention to include alternate degree spacing.

Since the cam disc is an integral element including both the open limit location 78 for engagement against the first direction indicator 82 and the closed limit location 80 for engagement against the second direction indicator 84, selection of the first location 78 will correspondingly set the second location 80. In addition, due to the particular configuration of the cam disc 70 an angular shift of the first stop location 78 will correspondingly shift the second cam surface stop location 80. The invention thus provides constant angular shifting of the first and second cam surface locations relative to a unit of rotation of the cam disc. In other words, at valve assembly the valve element can be aligned for full flow by setting the open limit at a position where the ball fluid flow opening is closely aligned with the passageways of the central body section 12 and end fitting 14. Any misalignment that would normally occur due to tolerance stacking of the valve element is corrected. Accordingly, a full flow and optimum efficiency open position can then be achieved. This position may be permanently set by corresponding adjustment of the cam disc 70 so that the stop member 62 engages the open limit location 78 of the cam disc 70. The angular displacement of the cam disc to set the full open position correspondingly adjusts the full closed position a precise and equivalent degree. In an exemplary configuration, it has been determined that each fifteen degree rotation of the cam disc 70 shifts the stop surface locations approximately two degrees while insuring that the contact points 78, 80 between the cam disc and the stop member 62 are always located a constant relative angular spacing apart.

The invention has been described with reference to a preferred embodiment. Obviously, modifications and alterations will occur to others upon a reading and understanding of this specification. It is our intention to include all such modifications and alterations insofar as they come within the scope of the appended claims or the equivalents thereof.

Having thus described the invention, we now claim:

1. A stop assembly for a valve including a valve member mounted for rotational movement between first and second positions and including a rotatable drive member for moving said valve member between said first and second positions, said stop assembly comprising:

a stop member operatively associated wtih said drive member for rotation representative of drive member rotation;

a cam member adjustably mounted on said valve for engagement with said stop member to adjustably define said first and second positions, said cam member being configured to maintain a constant preselected angular spacing between said first and second positions irrespective of its position of adjustment.

2. The stop assembly as defined in claim 1 wherein said cam member comprises a cardioid configured disc.

3. The stop assembly as defined in claim 2 wherein said disc is mounted for rotational adjustment about an axis extending parallel to the axis of rotation of said drive member.

4. The stop assembly as defined in claim 2 wherein said stop member comprises a rigid member fixed to said drive member for rotation therewith and having a pair of laterally extending stop surfaces for engagement with said disc.

5. The stop assembly as defined in claim 4 wherein said pair of stop surfaces are substantially in the same plane.

6. The stop assembly as defined in claim 4 wherein said disc is configured to provide a constant degree shift of said first and second positions for each degree of rotation of said disc.

7. A dual position handle and cam stop assembly adapted for limiting rotational movement of an associated valve sealing means comprising:

a cam disc and a valve handle having first and second handle stop and direction indicators, said indicators being disposed relative to the cam disc for engagement against the disc at first and second handle stop limit locations, respectively, said locations being selectively positionable about a cam disc peripheral wall by rotation of the cam disc, said location further having a constant relative angular spacing for limiting the rotational movement of the valve handle to said constant relative angular spacing during cam rotation, said cam disc having cardioid-like contour at said peripheral wall for a constant rate of angular displacement of said stop limit locations per a unit of cam rotation.

8. The cam stop assembly, as defined in claim 7 wherein said first and second handle stop and direction indicators comprise a symmetrical flat-faced cam follower.

* * * * *